Feb. 7, 1961 S. J. GARTNER ET AL 2,970,709

ARTICLE FEED MECHANISM

Filed Dec. 15, 1958 11 Sheets-Sheet 1

INVENTORS
Stanley J. Gartner
LaRue V. Regelman,

BY Michael Hertz,
ATTORNEY

Feb. 7, 1961 S. J. GARTNER ET AL 2,970,709

ARTICLE FEED MECHANISM

Filed Dec. 15, 1958 11 Sheets-Sheet 2

INVENTORS
Stanley J. Gartner
LaRue V. Regelman,

BY Michael Hertz
ATTORNEY

Feb. 7, 1961

S. J. GARTNER ET AL 2,970,709

ARTICLE FEED MECHANISM

Filed Dec. 15, 1958

11 Sheets-Sheet 3

INVENTORS
Stanley J. Gartner
Larwe V. Regelman,

BY Michael Hertz,
ATTORNEY

Feb. 7, 1961

S. J. GARTNER ET AL 2,970,709

ARTICLE FEED MECHANISM

Filed Dec. 15, 1958

11 Sheets-Sheet 4

INVENTORS
Stanley J. Gartner
LaRue V. Regelman,

BY Michael Hertz,
ATTORNEY

INVENTORS
Stanley J. Gartner
LaRue V. Regelman,
BY Michael [illegible]
ATTORNEY

Feb. 7, 1961 S. J. GARTNER ET AL 2,970,709

ARTICLE FEED MECHANISM

Filed Dec. 15, 1958 11 Sheets-Sheet 6

INVENTORS
Stanley J. Gartner
LaRue V. Regelman,

BY Michael Hertz
ATTORNEY

Feb. 7, 1961 S. J. GARTNER ET AL 2,970,709

ARTICLE FEED MECHANISM

Filed Dec. 15, 1958 11 Sheets-Sheet 7

INVENTORS
Stanley J. Gartner
LaRue V. Regelman,

BY Michael Hertz,
ATTORNEY

Feb. 7, 1961 S. J. GARTNER ET AL 2,970,709

ARTICLE FEED MECHANISM

Filed Dec. 15, 1958 11 Sheets-Sheet 8

INVENTORS
Stanley J. Gartner
LaRue V. Regelman,

BY Michael Hertz,
ATTORNEY

ARTICLE FEED MECHANISM

INVENTORS
Stanley J. Gartner
LaRue V. Regelman,
BY Michael Hertz,
ATTORNEY

INVENTORS
Stanley J. Gartner
LaRue V. Regelman
BY
Michael Hertz
ATTORNEY

INVENTORS
Stanley J. Gartner
Larue V. Regelman,
BY Michael Hertz,
ATTORNEY 2,970,709

ARTICLE FEED MECHANISM

Stanley J. Gartner and La Rue V. Regelman, Emporium, Pa., assignors, by mesne assignments, to Sylvania Electric Products Inc., Wilmington, Del., a corporation of Delaware Filed Dec. 15, 1958, Ser. No. 780,331

14 Claims. (Cl. 214—301)

This invention relates to the handling of trays holding electronic components and to the loading of these components into an automatic electron tube mount assembling machine.

In the manufacture of electron tubes, so called automount machines are utilized to assemble the electrode structure which is subsequently welded to the lead-in wires of a glass wafer, the wafer and mount then being sealed to a bulb. The mount may comprise a cathode, one or more grids and an anode all held properly spaced from one another between a pair of insulating discs. With this invention electrodes, such as grids, which have been placed in aligned pockets in a tray, are automatically fed, one by one, to the automount machine.

It is contemplated by this invention to provide a machine which shall receive a stack of trays loaded with the electrodes, feed the trays individually to an electrode unloading mechanism, unload the electrodes onto an electrode dispenser and dispense the electrodes one by one to the automount machine.

It is an object of the invention to provide a reliable mechanism which shall automatically fulfill the functions set forth above.

Other objects will become apparent upon consideration of the following specification when taken in conjunction with the accompanying drawings in which.

Figures 6, 7, 7A:
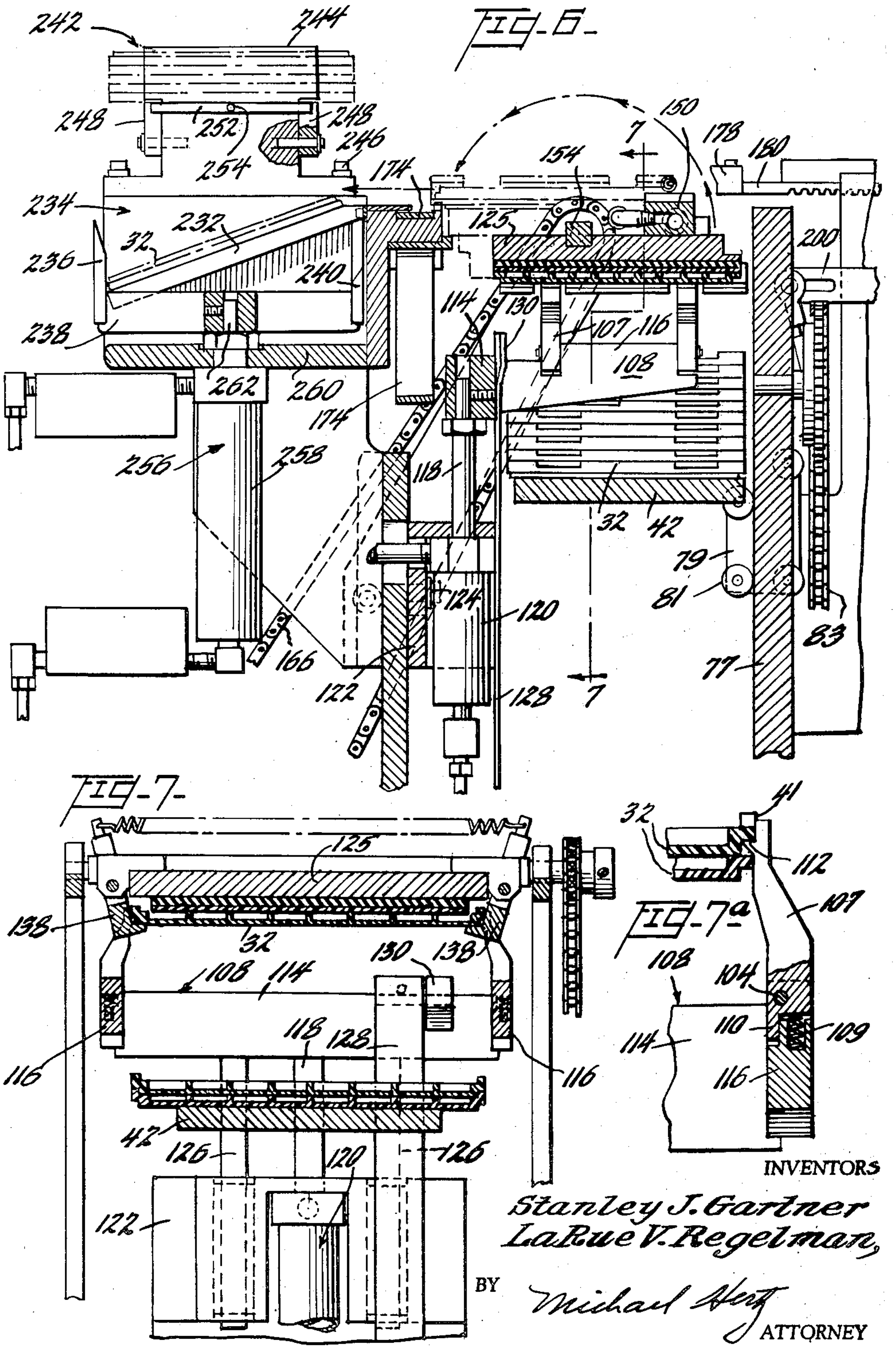
Fig. 6 is a vertical section of the upper end of the machine taken on the line 6—6 of Fig. 3.
Fig. 7 is a section on the line 7—7 of Fig. 6, illustrating the removal of a tray from the elevator by a transfer fork and the clamping of a tray by an inverted tray holding plate.

Fig. 7*a* is a detail of a pawl structure.

Figure 8:
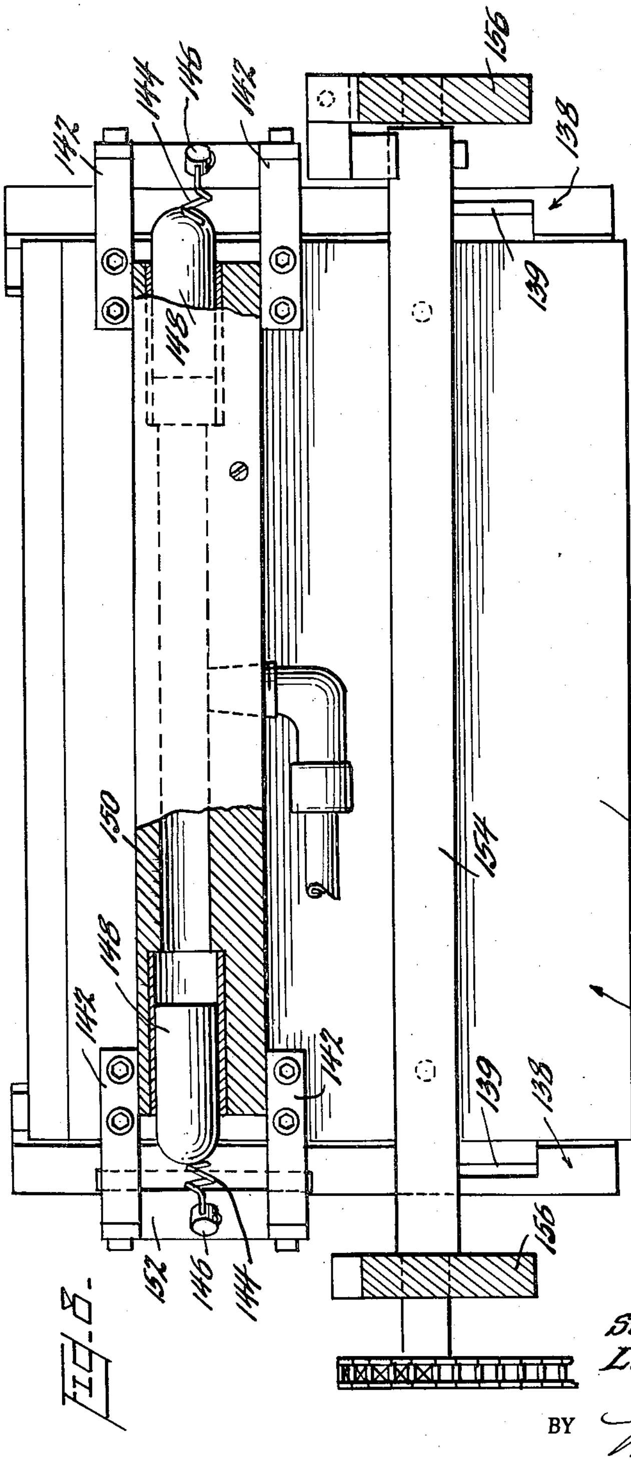

Fig. 8 is a plan view of the plate which is adapted to hold a loaded compartmented tray on the under, nonvisible, face thereof.

Figure 9:
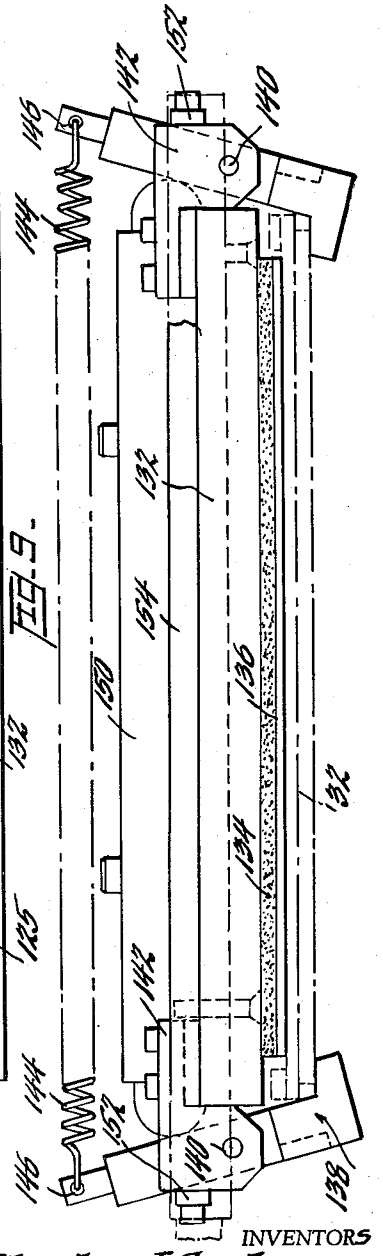

Fig. 9 is an end view of the invertible plate with a tray in clamped position and shown in dot and dash lines.

Figure 10:
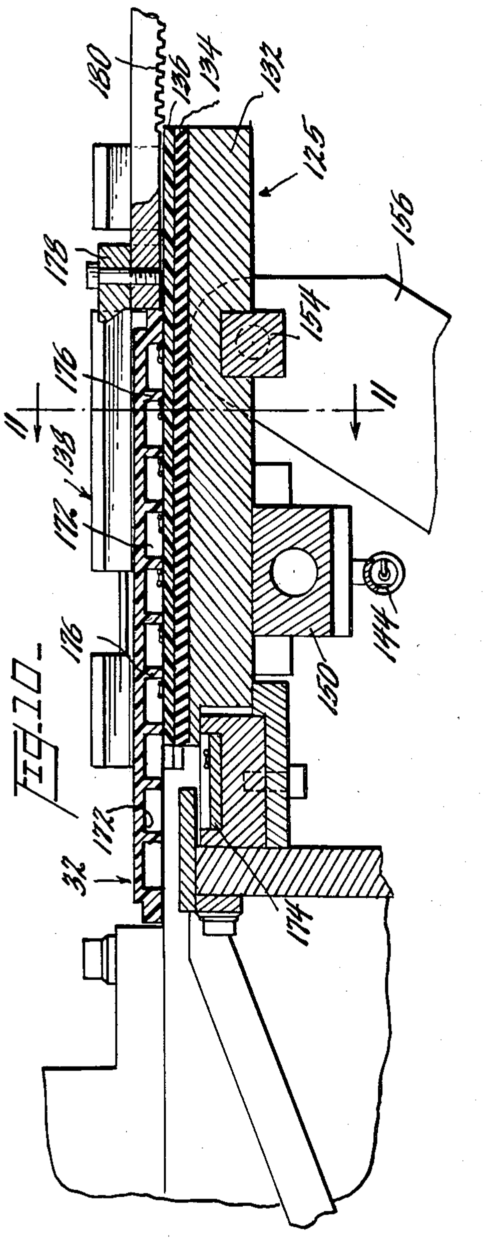

Fig. 10 is a sectional view of the reversible plate and tray carried thereby inverted from the position shown in Figs. 8 and 9 together with adjacent mechanism.

Figure 11:
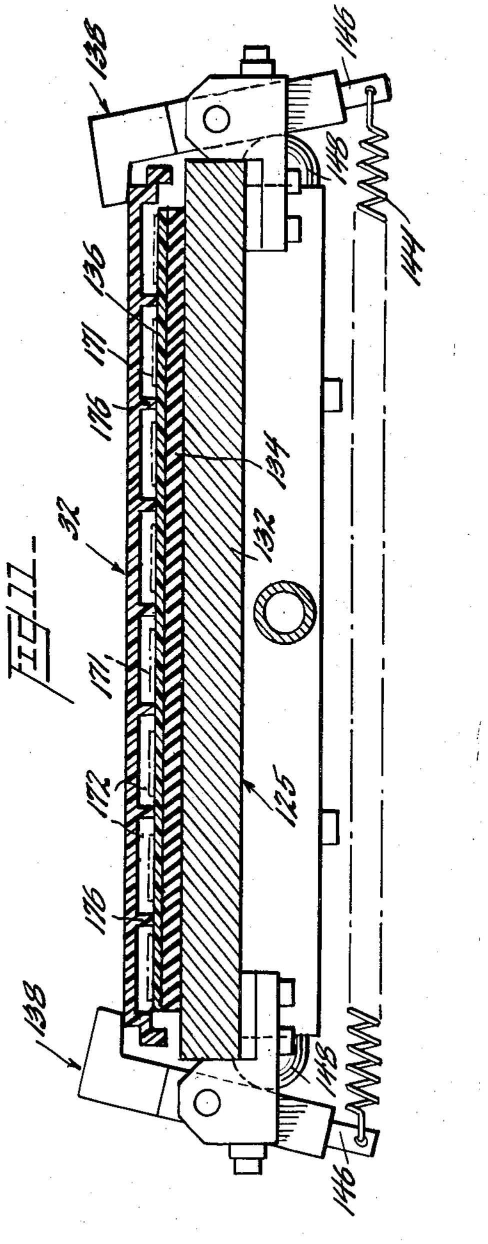

Fig. 11 is a section of the line 11—11 of Fig. 10.

Figure 1:
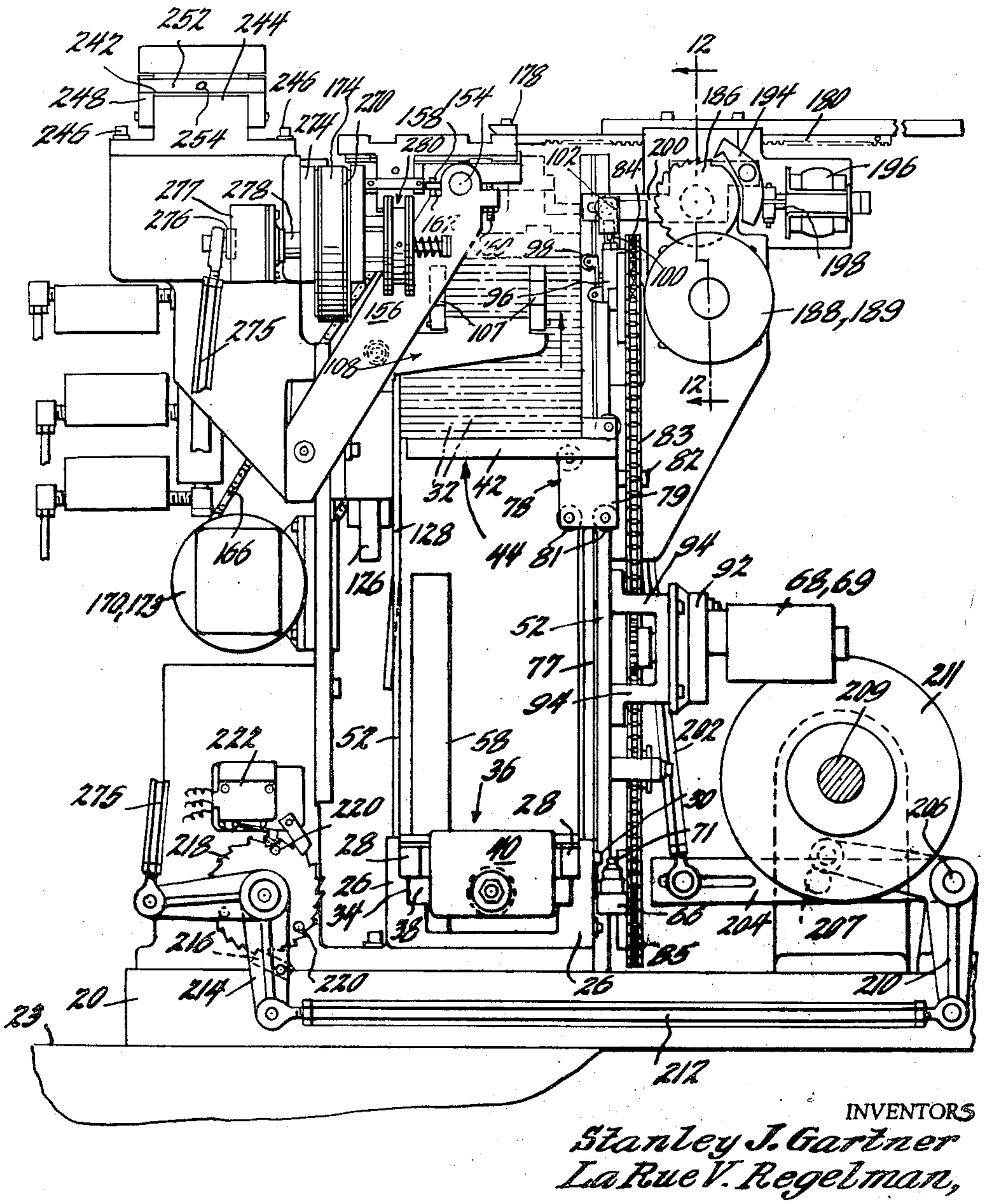
Fig. 1 is a front view of the machine.
Figures 5, 12:
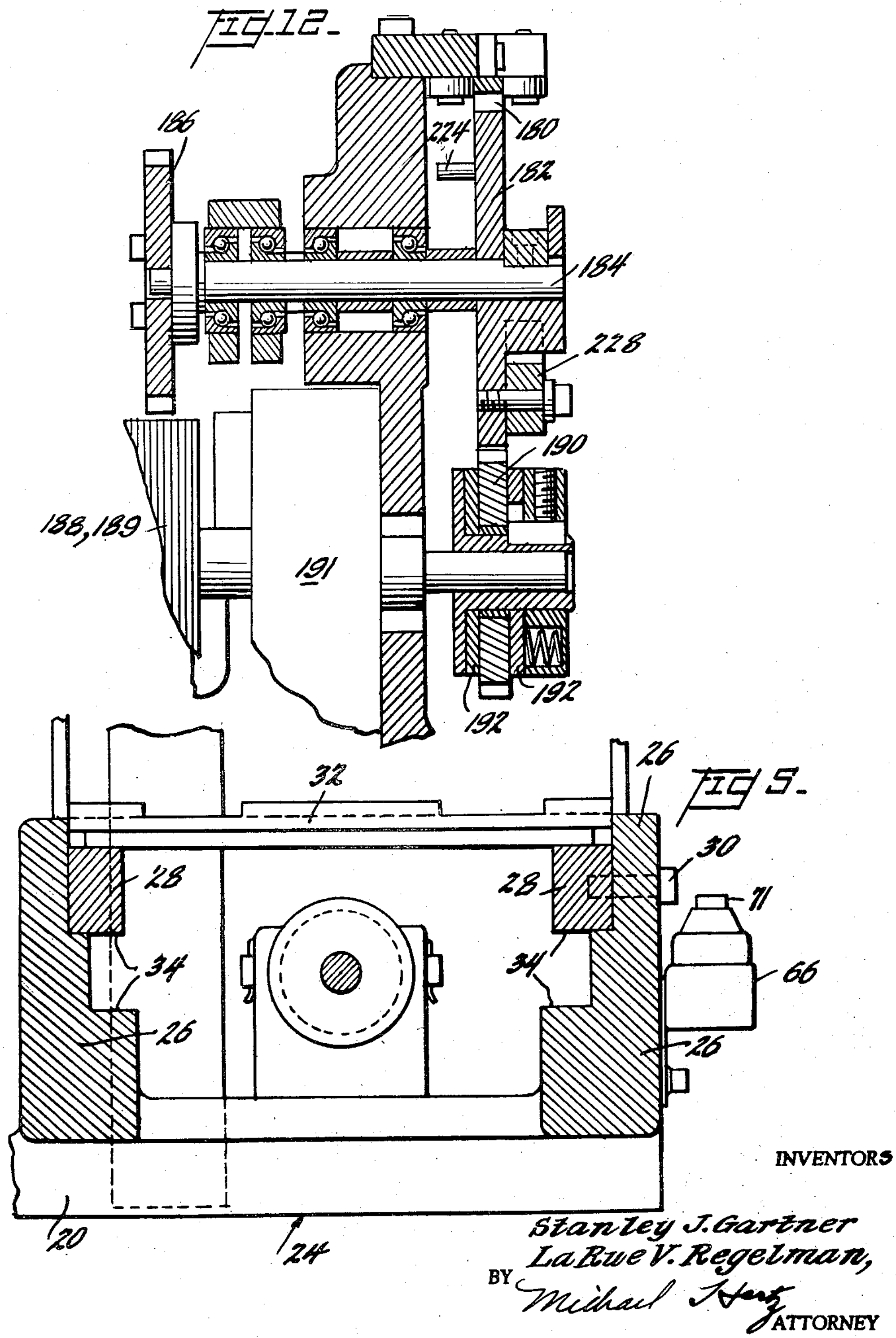
Fig. 5 is a section taken on the line 5—5 of Fig. 2.

Fig. 12 is a section on the line 12—12 of Fig. 1 illustrating a portion of the mechanism for driving a tray through the clamps on the reversible plate.

Figure 13:
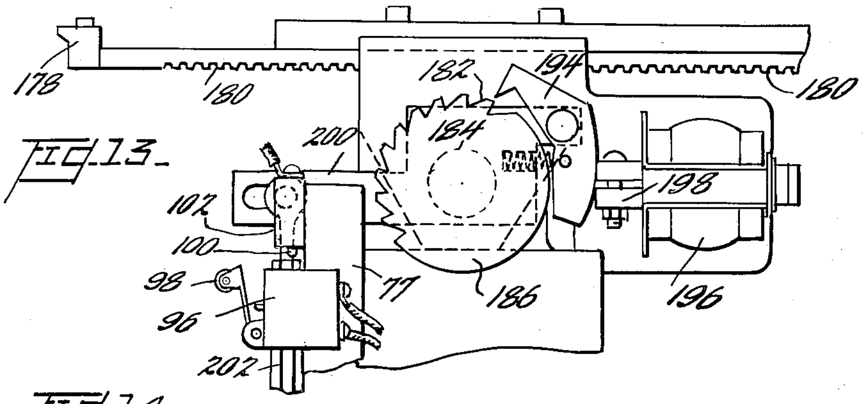

Fig. 13 is a view of Fig. 12 looking at it from the left.

Figures 14, 15:
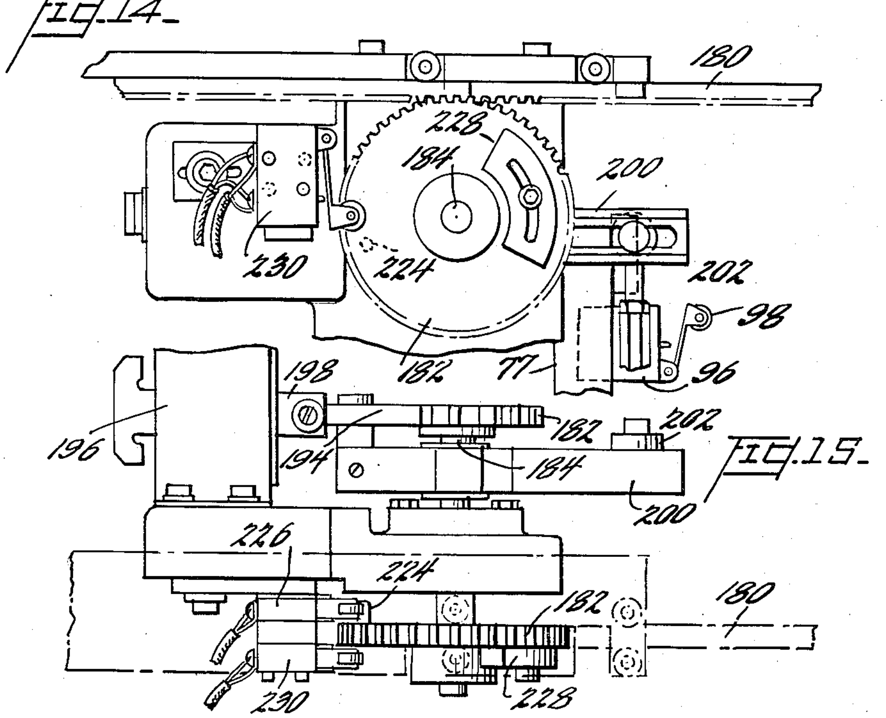

Fig. 14 is a view of Fig. 12 looking at it from the right.

Fig. 15 is a plan view of Fig. 14 showing the relationship of a gear with associated switches.

Figures 16, 17:
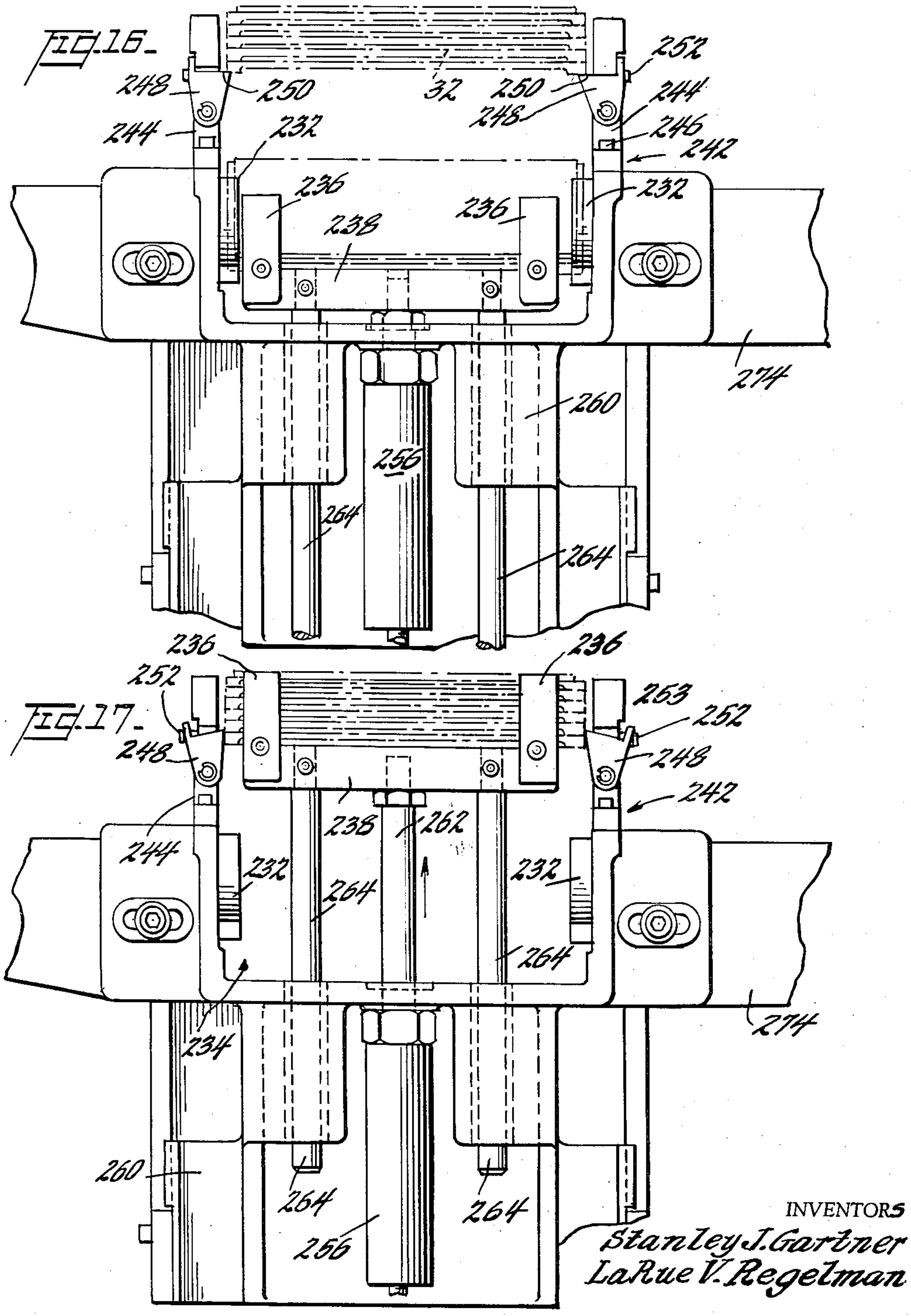

Fig. 16 is an end view of an empty tray stacking mechanism looking at the machine from the left of Fig. 6.

Fig. 17 is a similar view with an upstacking elevator shown in a partly raised position.

Figure 18:
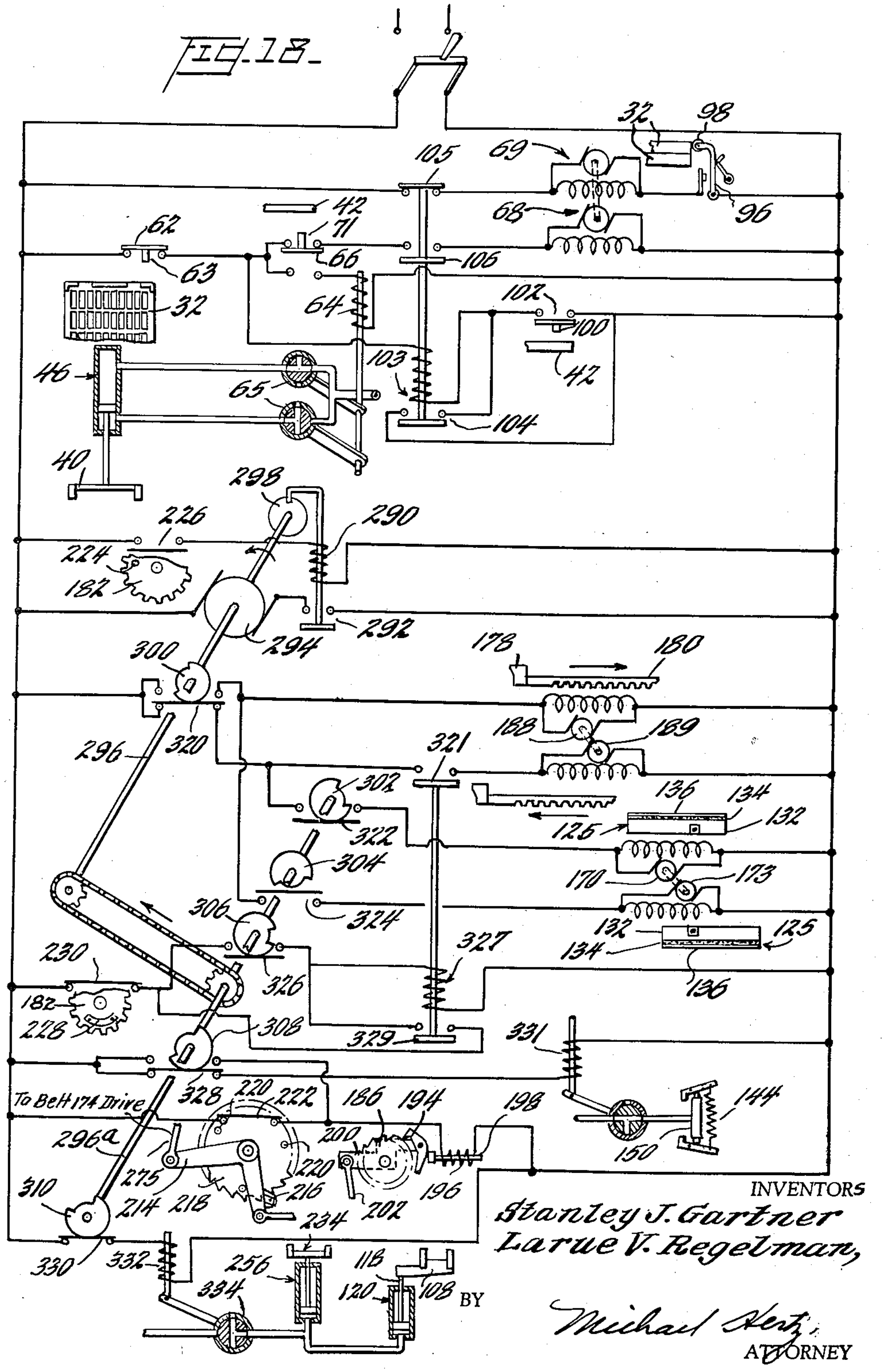

Fig. 18 is a circuit diagram of the machine.

Figure 19:
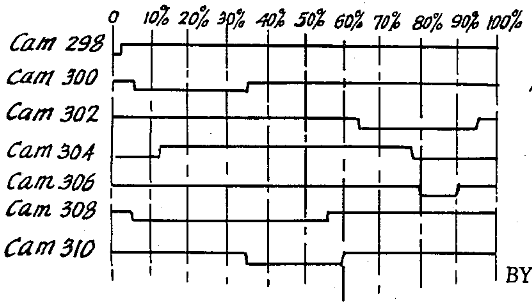

Fig. 19 is a timing diagram of cams operated by a timing motor and

Figures 3, 20:
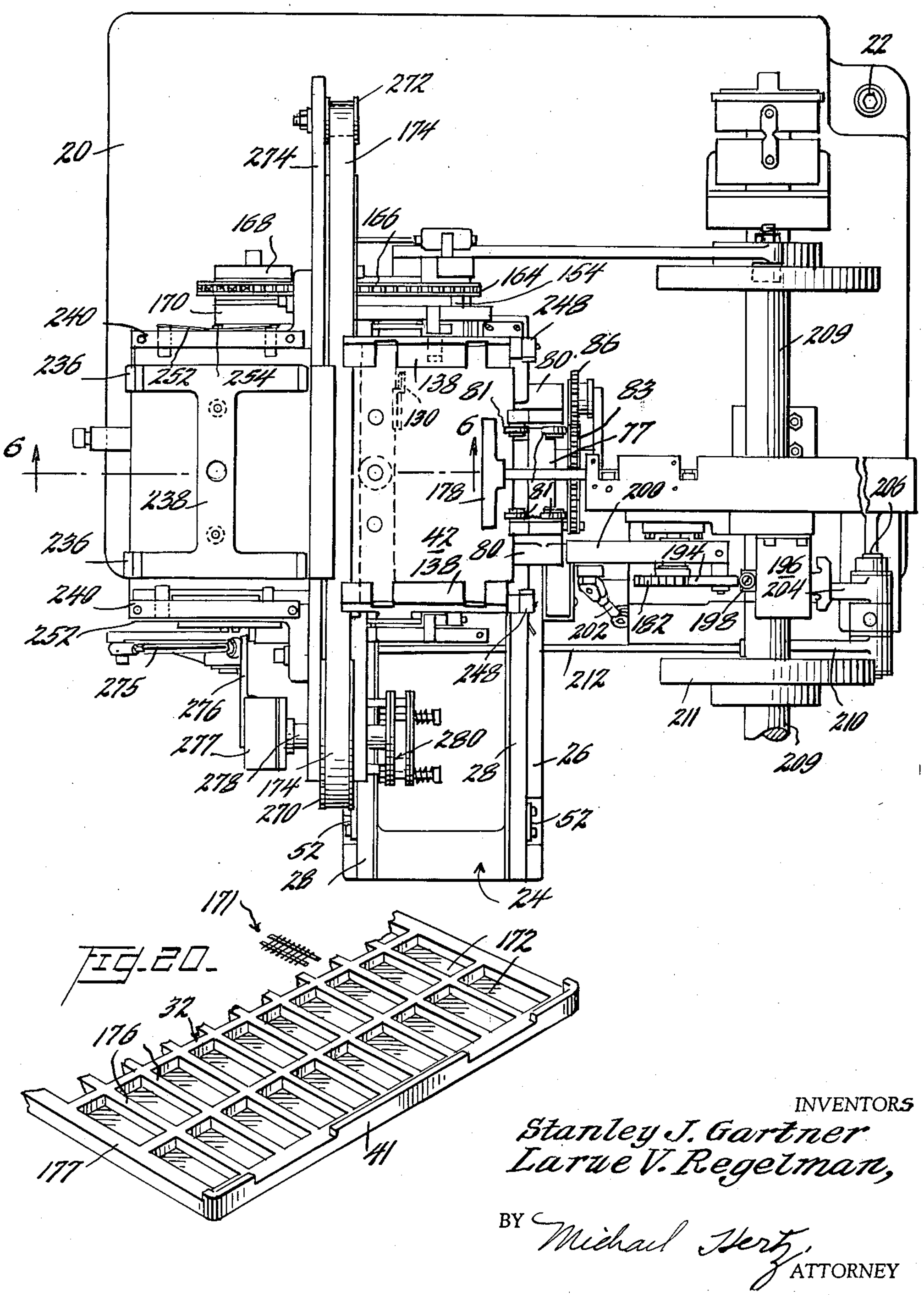
Fig. 3 is a plan view of the machine.

Fig. 20 is a perspective view of a portion of a grid tray handled by the machine.

Figure 4:
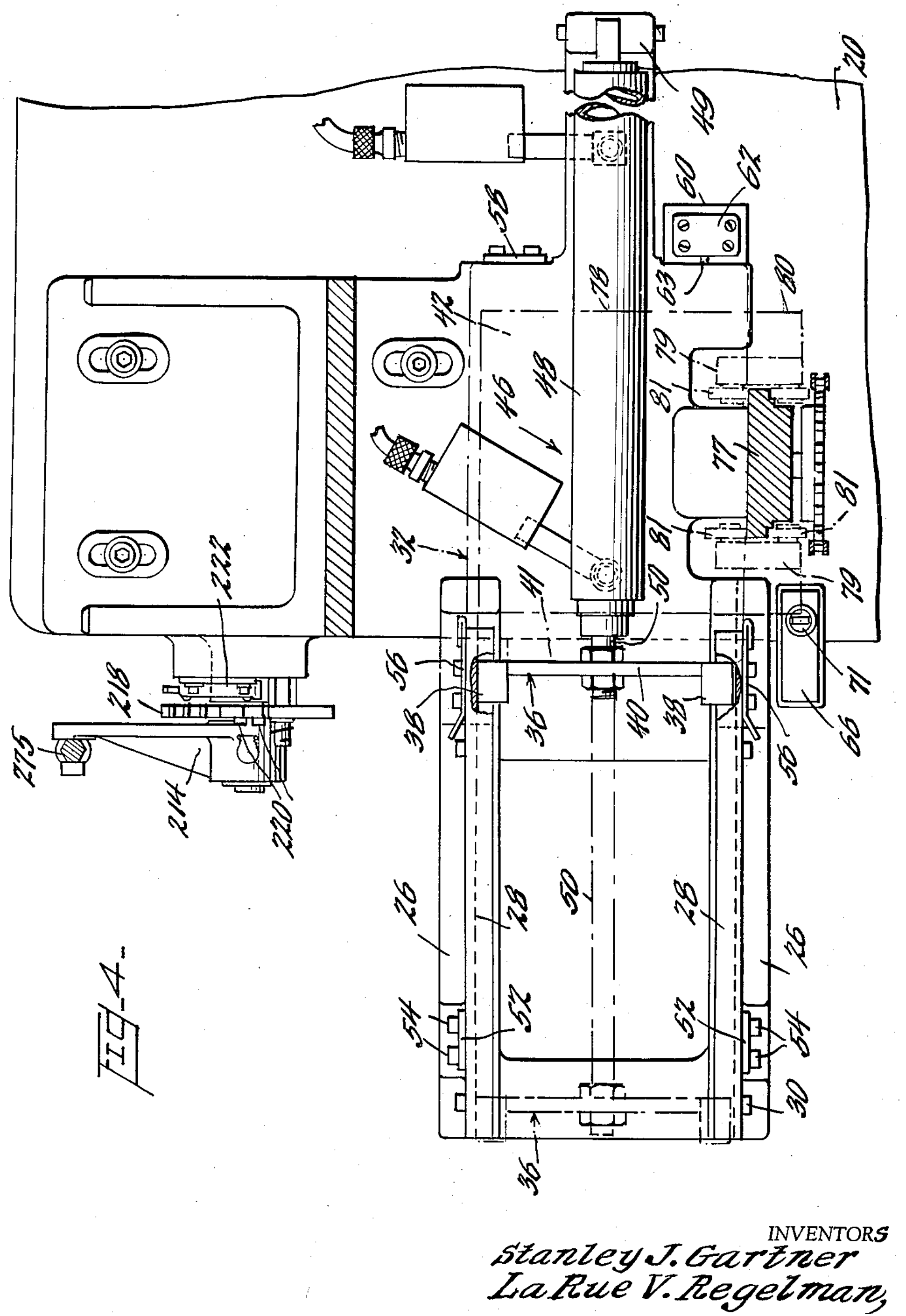
Fig. 4 is a horizontal section near the bottom of the machine taken on the line 4—4 of Fig. 2.

Referring to the drawings with greater particularity, at 20, Figs. 1 to 5, is the bedplate of the machine suitably fastened as by bolts 22 to the frame 23 of the automount machine, not shown. The bedplate has a forwardly extending framework 24 on which is mounted a pair of upstanding side cheeks 26 to the inside shouldered face of each of which is fastened a rail 28, as by bolts 30. The rails 28 on their upper surfaces are capable of slidably supporting a stack of compartmented trays 32. Slidable in slideways 34 formed between the bottoms of the rails 28 and shouldered portions of the cheeks 26 is a tray pusher carriage 36 having slides 38 riding in the ways 34 and a vertical face plate 40 integral with the slides in position to engage with an end face 41 of a bottommost tray of a stack of trays which may be placed behind the pusher. On movement of the pusher toward the back of the machine, the bottommost tray of a stack and the trays stacked thereon will be pushed over the platform 42 of a tray lift elevator 44. To reciprocate the carriage 36 between a normal forward position and a position close to the platform of the elevator there is provided a double acting fluid motor 46 whose cylinder 48 is suitably fastened to an extension 49 of the bedplate and whose piston rod 50 at its forward end is fastened to the face plate 40. Fastened to each of the cheeks 26, Figs. 1, 3 and 4, is a vertical guide bar 52, as by bolts 54, these bars facilitating proper vertical stacking of trays on the rails, and fastened to these cheeks toward the rear thereof are a pair of forwardly angled vertical plates 56 to guide the rear faces of the trays of a stack properly into position onto the tray lift elevator when the stack is pushed rearwardly. To limit the rearward movement of the trays as they are being pushed onto the tray lift elevator, a vertical stop plate 58 is provided, the same being suitably fastened at its lower end to the bedplate. Mounted on top of a bracket 60 fastened to the bedplate and located to the rear of the elevator is a normally closed switch 62 whose horizontal plunger 63 is in the path of movement of the bottommost tray 32 of a stack of trays being loaded onto the elevator. With the platform down, when the tray engages and opens the switch 62, a circuit to the coil 64 of an electromagnetically operated pair of 3-way valves 65 is broken, see Fig. 18, which admits fluid pressure behind the piston of motor 46 while venting the cylinder in front of the piston, thereby causing the pusher face-plate 40 to move to the normal forward position shown in dotted lines in Fig. 4. The coil 64 is in series with the single pole double throw switch 66 which is forced to the down position by the downward movement of the elevator platform. When the elevator moves up, the switch 66 moves to an up position to prepare a circuit to a motor 68, said motor serving to operate the elevator. When the platform descends, after all the trays have been unloaded therefrom, the lower surface thereof engages the plunger 71 of switch 66, to open the circuit to the motor 68 and to complete the circuit to the electromagnet 64 to energize fluid motor 46 in a direction to cause the plate 40 to push a stack of trays onto the now lowered platform. As stated heretofore, when the bottommost tray, in its loading movement over the elevator strikes the plunger 63 of switch 62, the coil 64 is deenergized, thereby reversing the valves 65 and effecting a movement of the pusher plate 40 away from the elevator and to the front of the machine.

The elevator platform is vertically shiftable on a vertical rabbeted rail bar 77, the bar being straddled by a roller carriage 78 comprised of a pair of end plates 79 fastened to the inner faces of tines 80 of the platform, each plate journalling upper and lower pairs of rollers 81 engaging opposite faces of the bar. One of the end plates mounts a stud 82 fastened in any convenient manner to a link of a sprocket chain 83 which is entrained about an idler sprocket 84 mounted on the upper end of rail bar 77, a lower idler sprocket 85 also mounted on the bar 77, an intermediate chain tightening sprocket 86 supported by an adjustable arm 87 pivoted on the bar 77 and a drive sprocket 88 driven through a reduction gearing in box 92 by the motor 68, the motor having feet 94 straddling the drive gear and fastened to the bar 77. The motor 68, as previously stated, is under control of switches 62 and 66, as well as other switches as will be described.

Mounted on the upper end of the bar 77 is a biasedly closed microswitch 96 whose operating roller 98 is engaged by the topmost tray 32 on the platform to open the switch, the switch being in series with the motor 69 whose armature is fixed to the same shaft as the armature of motor 68. When the loaded elevator rises, the motor 69 is driven until a top tray operates the roller 98 whereupon the motor stops. When a top tray is removed, as will be described, the switch again closes and the elevator moves up until the next tray again opens the switch 96. When the last tray has been removed the elevator platform 42 moves to a height sufficient to engage a plunger 100 to close a switch 102 mounted on the bar 77, this switch being in series with a coil of a self-locking relay 103, the coil of the relay being connected to a line leading to a point intermediate switches 62 and 66. Therefore, when the switch 62 is closed, the coil is energized to close contacts 104, in parallel with the switch 102, to maintain the relay energized until the switch 62 is opened. Energization of relay 103 opens a normally closed contact 105 in series with the motor 69 and switch 96 to break the upward elevator drive operation of the motor and also closes a normally open contact 106 which through normally upwardly positioned switch 66 and normally closed switch 62 establishes a circuit to the motor 68 to cause the elevator platform to move downwardly.

When the elevator platform, in its upward movement, is stopped by reason of a tray engaging actuating roller 98, the bottom of the tray is above pairs of tray transfer pawls 107, see Figs. 1, 2, 6 and 7, these pawls being pivotally mounted on a tray transfer fork 108, with springs 109, Fig. 7*a*, urging the upper free ends of the pawls toward each other, the pawls being limited in their movement by tails 110 engaging shoulders on the fork. The upper ends of the pawls are biased toward the faces of walls 41 of the trays and have sharp nosed notched portions 112 adapted to engage beneath and support a tray when the fork 108 is lifted. Normally the fork is at a lowered rest position with the noses of the pawls beneath the flanges of the topmost tray. The fork 108 is generally U-shaped and comprises a bight bar 114 and two parallel tines 116 perpendicular to the bar with the pawls pivoted on the tines. The fork is raised and lowered by the piston 118 of a single acting fluid operated motor 120, whose cylinder is secured to a bridge member 122 fastened to the frame of the machine by the vertically adjustable bolt and slot connections indicated at 124. Each time a tray is to be placed against an invertible plate 125, (see Figs. 6 to 11) as will be described, the motor 120 is controlled to cause the fork to make a complete up and down cycle. The fork is guided in its movement by a pair of guide rods 126 riding in vertical bearings in the bridge 122. To guide the trays in their vertical movement between the elevator and the reversing plate, the bridge has fastened thereto a vertical guide strip 128 flaring slightly outwardly from the adjacent sides of the trays at its lower end and terminating at its upper end in a bent cross piece 130. The control for the fluid motor 120 will be described later.

When the transfer fork raises a tray it will thrust it against the invertible plate 125 previously referred to. This plate, see Figs. 9 to 11, comprises a rectangular base 132 covered with a resilient bed 134, as of foam rubber, in turn covered with an antifriction surface material 136, such as "Formica." When the plate is to have a tray, with grids in the several compartments, clamped to the plate the resilient face is facing downwardly. To secure an upwardly moving tray to the plate, the plate has pivoted thereon a pair of elongated clamp jaws 138, Figs. 8 and 9 running the width of the plate, and cut out as at 139 to allow for the movement of the pawls of the tray lift fork and pivoted on pintles 140 in pivot blocks 142 fastened to the opposite face, now top face, of the plate. The clamp jaws are normally kept separated by a spring 144 under tension between a pair of pins 146 fastened in the pivoted clamp jaws. The jaws are moved to clamping position by a pair of pistons 148, Fig. 8, in the opposite ends of a cylinder 150, the clamping action being limited by straps 152 across the pivot blocks. When the plate is in position to receive a tray, the clamp jaws are initially opened. When the tray is against the plate and before the plate is inverted, fluid pressure is admitted to the cylinder 150 and the clamp jaws engage the tray.

The plate assembly is fixedly mounted on a shaft 154 pivoted in the upper ends of a pair of arms 156 fastened at an upwardly extending angle to the frame of the machine as shown in Fig. 1. To limit the rotative motion of the plate clockwise, in Fig. 1, the plate is provided with a stop 158 engageable with an adjustable screw 160 in the upper end of one of the arms 156. The counterclockwise rotation is limited by engagement of the stop 158 with a shoulder 162 on the same arm 156, the stop 158 for this purpose being made adjustable.

Figure 2:
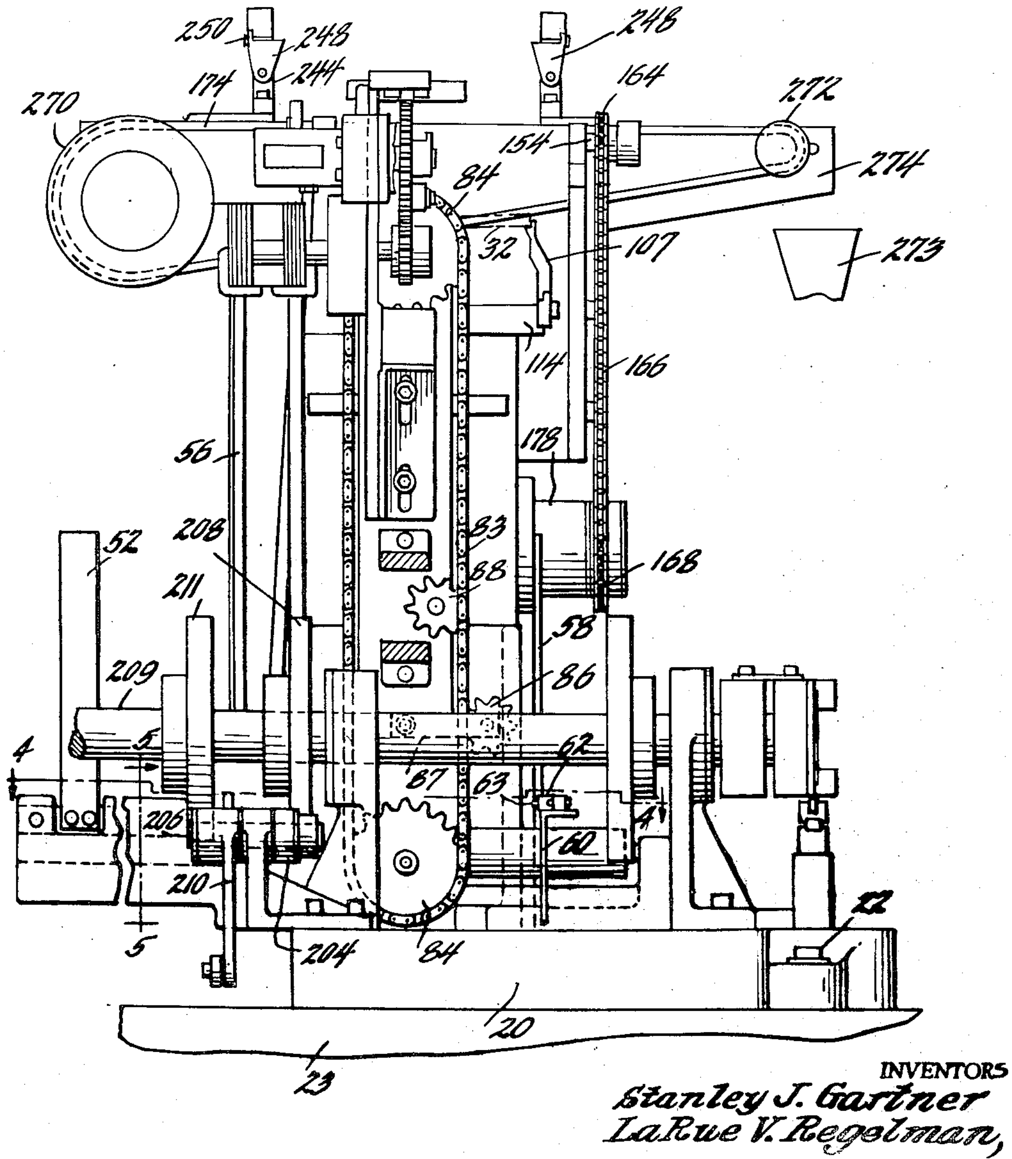
Fig. 2 is a side view of the machine of Fig. 1 looking at it from the right.

To oscillate the plate, the shaft 154 extends to the rear beyond an arm 156 and has fastened thereto a sprocket gear 164, see Figs. 2 and 3, connected by a sprocket chain 166 to a friction clutch driven chain driving gear 168, the friction clutch being driven by a pair of motors 170 and 173 mounted on the frame of the machine.

After a trap has been clamped to the inverted plate and the plate is inverted, the tray will be pushed, in increments, to unload a line of grids 171 in the compartments 172 in the tray onto an intermittently movable belt 174. The tray is compartmented by reason of vertical walls 176 of a height equal to the height of the end walls 177 along the long dimension of the tray. As a result, when the plate is inverted, the grids in the compartments will fall onto the "Formica" top but when the tray is pushed along the surface of the "Formica" the grids will be pushed ahead by the compartmental walls in the tray. The clamp jaws 138 hold the tray only lightly against the "Formica" top to enable the tray to be pushed through the clamps and along the plate surface.

To push the tray there is provided, see Figs. 1 and 10, a push bar 178 mounted on the outer end of a rack 180 which is driven by a gear 182, see Figs. 14 and 15, the gear being fixedly mounted on one end of a shaft 184 oscillatably mounted in the machine frame and having on its other end a ratchet 186 with as many teeth as there are columns of compartments in the tray, here illustrated as being 10 columns. To rotate the ratchet in a manner to be described, there is provided motors 188 and 189 whose armatures are fastened to a common shaft driving the gear 182 via a reduction gearing 191 and friction gear 190 held between spring pressed plates 192 on the shaft driven by the reduction gearing. Rotation of the ratchet wheel counterclockwise in Fig. 1 is effected by a spring pressed pawl 194 which is under control of a solenoid 196 which when energized causes its core 198 to engage the tail of the pawl to render the pawl inoperative to advance the ratchet. The pawl is pivotally mounted on one end of a stepped lever 200, the other end of the lever being operated by a vertical link 202 whose lower end, see Fig. 1, is connected to a lever 204 mounted on a stub shaft 206, see Figs. 1 to 3, and having a cam follower 207 intermediate its ends riding in the track of a face cam 208, Fig. 2, the cam being fixed on a shaft 109 driven in synchronous relationship with the main shaft of the automount machine with which the grid feed mechanism is employed. Also mounted on the stub shaft is a bell crank lever 210 operated by a face cam 211 fixed on the main shaft 209, driving a horizontal link 212 connected to a vertical arm of a bell crank 214. The same arm of the bell crank carries a spring pressed pawl 216 operative on a ratchet 218 mounted on the machine frame, the ratchet having in the case of eight compartments in a row in a tray a multiple of eight teeth e.g., twenty-four teeth. At every eighth tooth there is a switch controlling pin 220 operative to engage the arm of a micro-switch 222 which deenergizes the solenoid 196, to allow the ratchet 186 to advance one tooth when the stepped lever 200 is operated. Thus eight revolutions of the face cam 211 are necessary to effect one advancing movement of the ratchet 186 and one advancing movement of the tray. This is to allow 8 grids previously deposited upon the belt 174, Fig. 3, to be discharged from the belt by eight step movements of the belt. After ten operations of the ratchet 186, a pin 224 on the gear 182 closes a switch 226 mounted on the machine frame, to cause the switch to perform a multiplicity of functions. One of them is to close a circuit to the rack driving motor 188 to cause it to operate and pull the rack 180 back to its rear position out of the way of the inverting plate 125 and to then energize motor 189 to drive the pusher toward the new tray. Upon the energization of motor 189, the gear 182 reverses. Upon this reversal a plate 228, adjustably mounted on the gear 182, strikes a normally closed switch 230 to open the same and stop the forward tray advancing motion of the motor 189. This takes place when the pusher just engages a new tray and has pushed it to just where the next effective index of pawl 194 would unload the first row of grids onto the conveyor belt 174.

The tray is intermittently driven laterally until the last row of grids has been emptied whereupon the tray has moved a further distance such that it is no longer held by the clamp jaws of the plate and where it is over a pair of fixed inclined rails 232, Figs. 6, 16 and 17, of an upstacker assembly 234 and against a pair of upstanding stop bars 236 at the ends of left hand legs of an empty tray stacking elevator H frame 238 which frame is normally below the tops of the rails, as shown in Figs. 6 and 16. A pair of projections 240 extend upwardly from the right hand ends of the legs of the H frame to become effective in conjunction with the bars 236 to position the tray between the bars 236 and the projections 240 when the frame is elevated to remove the tray from off the inclined rails and transport it to within an overhead storage frame 242 comprised of two parallel plates 244 mounted by bolts 246 atop a frame portion of the machine and each plate pivotally supports a pair of pawls 248, with shoulders 250 adapted to engage underneath the bottommost tray of a stack of inverted trays 32 held by the storage rack. To press the shoulders inwardly to support the trays, each plate has affixed thereto a spring leaf 252, lying in recesses 253 in the outer faces of the plates 244 and held thereto by a central bolt 254. Fluid pressure, as will be described, is admitted into a motor 256 whose cylinder 258 is mounted at its upper end in a bridge frame 260 fastened to the frame of the machine. The piston rod 262 of the motor is fastened to the H frame 238 which is guided in its movements by a pair of guide pins 264 sliding in bearings in the bridge frame.

The conveyor belt 174, see Figs. 1, 2 and 3, is trained over a large front driving pulley 270 and a small rear idler pulley 272, over which the grids are delivered to a funnel 273 leading to the automount machine. Both pulleys are mounted on a conveyor plate 274 fixed to the machine frame with the idler pulley adjustable longitudinally of the belt.

The pulley is driven intermittently from the bell crank lever 214 which through a link 275 drives a lever 276 and which in turn drives a one way clutch 277 to operate a shaft 278 rotatably mounted in the plate 274 and on which is keyed the pulley 270. Over-running of the pulley is prevented by a friction clutch plate arrangement indicated generally at 280. The distance the belt moves for each operation of the lever 276 is equal to the distance longitudinally of the tray compartments, from the end of one compartment to the corresponding end of the next compartment. Each grid as it tumbles off the delivery end of the pulley 272 drops into the funnel 273, the lower end of which is gated in timed relationship with the automount machine for proper delivery of the grid to the said machine.

Referring back to Figs. 14 and 15, the pin 224 on the gear 182 operates the switch 226 after all of the compartments of a tray have been unloaded, the just unloaded tray having been pushed out from the hold of the clamp jaws 138 and onto the inclined rails 232, upon which the tray will slide downhill until stopped by the stop bars 236 of the upstacker assembly 234. When the switch 226 operates the following functions are performed: (1) The rack 180 is retracted by operation of motor 188. (2) The tray clamp assembly of Figs. 8 to 11 is inverted by operation of motor 170 to receive another grid loaded tray from the fork lift elevator. (3) The clamps on the tray clamp assembly are released to be opened up to allow the loaded tray to be fully seated against the "Formica" covering on the padded plate 132. (4) The motor 120 operative on the fork 106 is energized to pick up a tray from the top of those on the elevator platform and transport it against the "Formica" face. (5) The clamp jaws again close under the newly received grid loaded tray. (6) A second motor 173 whose armature is fixed to the same shaft as the armature of motor 170 operates to bring the tray to inverted position above the plate and (7) The rack driving motor 189 is energized to bring the rack back to contact the rear edge of the newly inverted tray.

Referring to Fig. 18, it will be seen that when the pin 224 on gear 182 closes a normally open limit switch 226, a relay coil 290 is energized which closes a switch 292 in series with slow drive timing motor 294. This timing motor has a shaft or driven together shafts 296, 296a on which are mounted a cam 298 for holding the switch 292 closed and six switch operating cams 300, 302, 304, 306, 308 and 310. The cam 298 has a notch in it to allow the plunger of switch 292 to drop to open circuit position. However, when the coil 290 is energized, the plunger is withdrawn upward into the coil, the switch 292 is closed and the motor 294 starts rotating to reverse the rotation of gear 182 and move the pin 224 counterclockwise away from the switch 226. The circular periphery of the cam 298 functions to maintain the switch 292 closed for one cycle of rotation of the motor driven shafting. The retraction of the rack 180 is under control of cam 300 operating a single pole double throw switch 320 which when in up position completes a circuit to the field winding of rack operating motor 188 so as to withdraw the rack and to the right as shown in Figs. 1 and 18.

After the rack bar has been withdrawn cam 304 closes a switch 324 to energize motor 173 to flip the plate 125 over to tray receiving position with the padded surface presented downwardly as shown in section in Fig. 6, after which the cam 302 allows biasedly closed switch 322 in the circuit to motor 170 to close while the switch 324 is opened to restore the plate 125 to a position with the padded surface uppermost. In the meantime the cam 300 has again closed the lower contact of switch 320 to enable the motor 189 to drive the pusher to the left, see Figs. 1 and 18, until it engages the newly loaded tray on the plate 125. The motion of the rack to the left is arrested by opening of a relay controlled switch 321 as will be described. The plate 228 on gear 182, as the gear revolves with the initial advance movement of the pusher rack strikes and opens a normally closed switch 230 opening a holding circuit for the coil of a self locking relay 327. The relay 327 is energized and its core drawn upward during the operation of timing motor 294 by operation of cam 306 on normally open switch 326. When the circuit to the coil of relay 327 is closed by closure of switch 326, the core is drawn up and the switch 329 is closed establishing a short circuit about switch 326 to maintain the coil of relay 327 energized until its contacts are allowed to drop out by opening of the switch 230. When the relay becomes deenergized, opening switch 321, the drive of the pusher 178 by the motor 189 ceases, subsequent drive of the pusher being taken over by the ratchet and pawl 186, 194. The timing motor 294 also controls the operation of the tray to plate clamping mechanism in the following manner: On the shafting driven by the timing motor is the cam 308 which is operative upon the double throw switch 328 which normally is in its down position to maintain a valve operating solenoid 331 energized to allow air to normally flow into tray clamping cylinder 150 to hold a tray against the plate. Early in the operation of the timing motor the cam 308 allows the switch 328 to move to its up position whereby the tray clamp cylinder valve is rotated to vent the cylinder and whereupon the spring 144 on the plate 125 takes over and releases the clamps. The timing is such that air pressure to the clamps is not reapplied until after a tray has been forced up against the inverted plate by the fork 108. The cam 310 on the shafting is operative to close a switch 330 to energize a solenoid 332 which in turn operates a valve 334 to admit air to the tray lift motor 120 to transfer a tray to the inverted plate 125 and also to admit air to the motor 256 to stack the tray by operation of the elevator 234. A complete cycle of the timing motor takes place long before all of a line of grids loaded on the conveyor have been dispensed from the conveyor.

No attempt has been made in Fig. 18 to give the exact orientation of the cams on the shafting nor the exact extent of low dwells on the cams. The precise orientations of the respective cams and the extent of their dwells are given in the timing chart shown in Fig. 19.

It should be noted that since at the time of tray inversion, the pin 220 on ratchet 218 is holding the switch 222 open for a complete grid acceptance cycle of the automount machine and thereby would allow the pawl 194 to energize the ratchet 186, thus preventing reverse movement of the rack 180, a shorting of the switch 222 is effected, under control of the cam 308 by moving the switch 328 to its upper set of contacts to energize the solenoid 196. After the last stepping movement of a tray has been effected by pawl 194 engaging and operating ratchet 186 and the timer motor 294 has been started, the coil 196 is again energized by the closure of switch 328 to withdraw the pawl and allow withdrawal of the rack.

What is claimed as new is:

1. Means for feeding articles arranged in rows and columns in a compartmented tray to a machine comprising means to receive a stack of trays containing said articles, an invertible plate mounted on a fixed axis, means to transfer a top tray from off the stack of trays against the underside of the plate, means to invert the plate and tray to dump the articles in the tray onto the now top surface of the plate, a pusher operative to slide the tray and the articles entrained in the compartments of the tray laterally off the edge of the plate whereby the articles may drop from off its plate, a conveyor below the plate adjacent the edge thereof to receive the dropped articles and drive mechanism to move the conveyor.

2. Means for feeding articles arranged in rows and columns in a compartmented tray to a machine comprising means to receive a stack of trays containing said articles, an invertible plate mounted on a fixed axis, means to tranfer a top tray from off the stack of trays against the underside of the plate, means to clamp said transferred tray to the plate, means to invert the plate and tray to dump the articles in the tray onto the now top surface of the plate, a pusher operative to slide the tray and the articles entrained in the compartments of the tray laterally off the edge of the plate whereby the articles may drop from off the plate, a conveyor below the plate adjacent the edge thereof to receive the dropped articles and drive mechanism to move the conveyor.

3. Means for feeding articles arranged in rows and columns in a compartmented tray to a machine comprising means to receive a stack of trays containing said articles, an invertible plate, means to transfer a top tray from off the stack of trays against the underside of the plate, means to invert the plate and tray to dump the articles in the tray onto the now top surface of the plate, a pusher operative to slide the tray and the articles entrained in the compartments of the tray laterally off the edge of the plate whereby the articles may drop from off the plate, a conveyor below the plate adjacent the edge thereof to receive the dropped articles, drive mechanism to move the conveyor, means to receive the empty tray, an upstacking elevator below the last means, an empty tray storage rack above the elevator, and means under control of a part movable with the pusher to operate the upstacking elevator.

4. Means for feeding articles arranged in rows and columns in a compartmented tray to a conveyor comprising, an elevator, a tray transfer device, an invertible plate, a conveyor alongside of the plate and a pusher, a pair of clamps on said plate between which clamps and the plate a tray may slide, means to invert the plate to tray loading position and to bring the clamps below the plate, means to operate the elevator to bring a tray to a position where the tray transfer device may engage the same, means to operate the transfer device to engage a tray on the elevator and bring it up against the inverted plate, means to operate the clamps to hold the tray against the plate, means to invert the plate to dump the contents of the compartmented tray onto the plate and means to intermittently operate the pusher to slide the tray over the plate whereby a row of articles will be spacedly located on the conveyor.

5. Means for feeding articles arranged in rows and columns in a compartmented tray to a receiver comprising an invertible plate, an advancing pusher and mechanism for pushing an inverted tray on the plate and in a direction to move the articles in a column over the receiver, a timer motor, means operative after a given amount of advancing movement of the pusher, and sufficient to thrust the tray from off the plate, to set the timer motor into operation, control means driven by the timer motor, and means under control of the control means to retract the pusher, invert the plate to receive a new tray, restore the plate with the tray thereon to its position before inversion, and to advance the pusher to a limited degree to engage the new tray.

6. Means for feeding articles arranged in rows and columns in a compartmented tray to a receiver comprising an invertible plate, a tray clamping mechanism thereon, an advancing pusher and mechanism for pushing an inverted tray on the plate through the clamping mechanism in a direction to move the articles in a column over the receiver, a timer motor, means operative after a given amount of advancing movement of the pusher, and sufficient to thrust the tray from off the plate, to set the timer motor into operation, control means driven by the motor, and means under control of the control means to retract the pusher, invert the unloaded plate to receive a new tray, operate the clamping mechanism to open and then close on the new tray, restore the plate with new tray thereon to the position wherein the new tray is inverted and to advance the pusher to a limited degree to engage the new tray.

7. Means for feeding articles arranged in compartments in a tray to a receiver comprising, an invertible plate with means thereon to support an inverted tray, said receiver being positioned to one side of the plate and below the inverted tray, a pusher for thrusting against the inverted tray and pushing the tray to unload the articles onto the receiver, a timer motor, means operative after a given amount of advancing movement of the pusher, and sufficient to thrust the tray from off the plate, to set the timer motor into operation, control means driven by the timer motor, and means under control of the control means to retract the pusher, invert the plate to receive a new tray, restore the plate with the tray thereon to its position before inversion, and advance the pusher to a limited degree to engage the new tray.

8. Means for feeding articles arranged in compartments in a tray to a receiver comprising an invertible plate with means thereon to support an inverted tray, said receiver being positioned to one side of the plate and below the inverted tray, a pusher for thrusting against the inverted tray and pushing the tray to unload the articles onto the receiver, an intermittently operative drive to advance the pusher, a timer motor, means operative after a given amount of advancing movement of said pusher as effected by the intermittently operative drive, and sufficient to thrust the tray from off the plate, to set the timer motor into operation, control means driven by the timer motor, and means under control of the control means to hold the intermittently operative pusher drive inoperative, retract the pusher, invert the plate to receive a new tray, restore the plate with the tray thereon to its position before inversion, advance the pusher to a limited degree to engage the new tray and release the intermittent drive so that it may be operative on the pusher.

9. Means for feeding articles arranged in compartments in a tray to an article receiver comprising, a plate with means thereon to support an inverted tray, said article receiver being positioned to one side of the plate and below the inverted tray, a tray storer and an associated elevator, said tray storer being located on the side of the article receiver opposite to the plate, a pusher for thrusting against the inverted tray and pushing the tray to unload the articles onto the receiver and the empty tray from off the plate onto the elevator, a timer motor, means operative upon shifting of the tray onto the elevator to set the timer motor into operation, control means driven by the timer motor, and means under control of the control means to bring a new tray to position on the plate whereby it may be shifted by the pusher and to operate the elevator to lift the previous tray into the tray storer.

10. Means for feeding articles arranged in compartments in a tray to an article receiver and for feeding the trays from a source of article filled trays to a storage rack comprising means for storing the filled trays, a plate, a transferrer operative to remove a filled tray from its source and transfer it to the plate, means to position the tray on the plate in inverted relationship of the tray, said article receiver being located to one side of the plate and below the inverted tray, the tray receiver being to the side of the article receiver opposite the plate, an elevator to lift an empty tray into the storage rack, a pusher to thrust against the tray to cause it to slide off the plate to unload the articles onto the article receiver and to cause the tray to move onto the elevator, a timer motor, means operative with the pusher to set the timer motor into operation, and means under control of the timer motor to control the movements of the pusher, control the transferrer to load a new tray onto the plate, control the inversion of the tray and to control the elevator to lift an unloaded inverted tray into the tray storage rack.

11. Means for feeding articles arranged in rows and columns in a compartmented tray to an intermittently movable conveyor comprising, a plate across which a loaded inverted tray is slidable, a conveyor alongside of the plate and below the tray, a pusher operative on the compartmented tray to thrust the tray across the plate so that a column of articles will be pushed by the compartmental walls of the tray off the plate and onto the conveyor, cyclically operable means to intermittently drive the conveyor, a pawl biased to ratchet engaging position and operated by said cyclically operable means, a ratchet connected with the pusher which when engaged by the pawl will drive the pusher and tray across the plate, and means under control of the cyclically operable means to hold the pawl out of engagement with the ratchet and to permit it to engage the ratchet at multiples of conveyor movement, all whereby successive rows of articles will be unloaded from the tray after all articles of a previous row have been transported away from the tray by the conveyor.

12. Means for feeding articles arranged in rows and columns in a compartmented tray to an intermittently movable conveyor comprising, a plate across which a loaded inverted tray is slidable, a conveyor alongside of the plate and below the tray, a pusher operative on the compartmented tray to thrust the tray across the plate so that a column of articles will be pushed by the compartmental walls of the tray off the plate and onto the conveyor, a one-way clutch to drive the conveyor, a drive shaft, cam operated means coupled to the drive shaft to operate the one-way clutch, a ratchet operatively coupled to the pusher, a pawl biased to engagement with the ratchet, a lever mounting the pawl to operate the same, lever operating cam means coupled to the drive shaft, an electromagnet which when energized maintains the pawl out of engagement with the ratchet, a normally closed switch in series with the electromagnet, and means driven in synchronism with the drive shaft operative on the switch for opening the switch after a number of operations of the one-way clutch to allow the pawl to engage the ratchet and operate the pusher and tray to dump a line of articles on the conveyor.

13. Means for feeding articles arranged in rows and columns in a compartmented tray to an intermittently movable conveyor comprising, a plate across which a loaded inverted tray is slidable, a conveyor alongside of the plate and below the tray, a pusher operative on the compartmented tray to thrust the tray across the plate so that a column of articles will be pushed by the compartmental walls of the tray off the plate and onto the conveyor, a one-way clutch to drive the conveyor, a drive shaft, cam operated means coupled to the drive shaft to operate the one-way clutch, a ratchet operatively coupled to the pusher, a pawl biased to engagement with the ratchet, a lever mounting the pawl to operate the same, lever operating cam means coupled to the drive shaft, an electromagnet which when energized maintains the pawl out of engagement with the ratchet, a normally closed first switch in series with the electromagnet, a ratchet wheel carrying equally spaced pins adjacent its periphery to operate said first switch, the number of pins being a submultiple of the number of teeth on the ratchet wheel, a second pawl movable with the cam operated means to drive the ratchet wheel, a timing motor, means controlled by the timing motor for inverting the plate when the pusher is withdrawn, a second normally open switch which when closed initiates a cycle of operation of the timing motor, a pin movable with the driven element of the one-way clutch to close the second switch to the timing motor, a cam driven by the timing motor, a normally open third, electromagnet controlling, switch closed by the timing motor driven cam, said third switch being in parallel with the normally closed first switch, means controlled by the timing motor to operate the pusher to withdraw the same from a tray and to initially move the pusher toward the tray, said third switch, when closed, maintaining the electromagnet energized notwithstanding opening of the first switch, whereby inadvertent operation of the pusher is avoided.

14. Means for feeding articles arranged in rows and columns in a compartmented tray to a conveyor comprising a drive shaft, a cam thereon, a lever operated by the cam, a one-way clutch operated by the lever and a conveyor operated by the one-way clutch, a gear movable with the driven element of the one-way clutch and a pin on said gear, a switch closed by the pin, said switch when closed initiating the operation of a timing motor for one cycle of operation, a plate alongside of the conveyor, a pusher operative on an inverted tray above the plate to effect transfer of the articles in batches contained in the tray onto the conveyor, means controlled by the timing motor to control the withdrawal of the pusher, means under conjoint control of the timing motor and a control element on the gear to effect an initial advance of the pusher, and further means, controlled by drive shaft rotation and the conveyor drive mechanism, for further advancing the pusher.

References Cited in the file of this patent

UNITED STATES PATENTS

| | | |
|---|---|---|
| 2,028,410 | Rapisarda | Jan. 21, 1936 |
| 2,453,077 | Newton | Nov. 2, 1948 |
| 2,526,309 | Welch | Oct. 17, 1950 |
| 2,821,825 | Gartner | Feb. 4, 1958 |